United States Patent
Amster et al.

(10) Patent No.: US 6,961,315 B1
(45) Date of Patent: Nov. 1, 2005

(54) TECHNIQUE FOR MONITORING CONVERSATIONAL VOICE OVER PACKET

(75) Inventors: James M. Amster, Aberdeen, NJ (US); Robert G. Cole, Churchville, MD (US); Joshua Hal Rosenbluth, Middletown, NJ (US)

(73) Assignee: AT&T Corp., Bedminster, NJ (US)

( * ) Notice: Subject to any disclaimer, the term of this patent is extended or adjusted under 35 U.S.C. 154(b) by 894 days.

(21) Appl. No.: 09/717,414

(22) Filed: Nov. 21, 2000

(51) Int. Cl.[7] ............................................... H04L 1/16
(52) U.S. Cl. ..................... 370/252; 370/401; 379/1.03; 455/67.4
(58) Field of Search ............................. 370/241, 241.1, 370/248, 252, 253, 401; 379/1.01, 1.03, 32.01; 455/67.1; 714/712, 100; 709/224

(56) References Cited

U.S. PATENT DOCUMENTS

| | | | | |
|---|---|---|---|---|
| 6,147,998 A | * | 11/2000 | Kelley et al. | 370/395.1 |
| 6,370,120 B1 | * | 4/2002 | Hardy | 370/252 |
| 6,678,250 B1 | * | 1/2004 | Grabelsky et al. | 370/241 |
| 6,741,569 B1 | * | 5/2004 | Clark | 370/252 |
| 6,748,433 B1 | * | 6/2004 | Yaakov | 709/224 |
| 6,775,240 B1 | * | 8/2004 | Zhang et al. | 370/251 |
| 6,778,493 B1 | * | 8/2004 | Ishii | 370/229 |

OTHER PUBLICATIONS

The E-Model, A Computational Model For Use In Transmittion Planning, 1998; International Telecommunication Union, ITU-T, G. 107; Series G: Transmission Systems And Media, Digital Systems and Networks.

* cited by examiner

*Primary Examiner*—Hassan Kizou
*Assistant Examiner*—Dmitry Levitan

(57) ABSTRACT

The quality of conversational voice for Voice-over-Packet transmissions on a Path (11) in a packet network (10) is achieved by injecting probe packets for transmission along the path and then measuring packet loss and the delay. From the delay and loss measurements, analytic values for the voice quality impairment caused by delay and by network loss, respectively, are established. An overall measure of the conversational voice quality is then derived in accordance with the algebraic sum of the analytic values for the voice quality impairment caused by delay and by network loss, respectively.

7 Claims, 1 Drawing Sheet

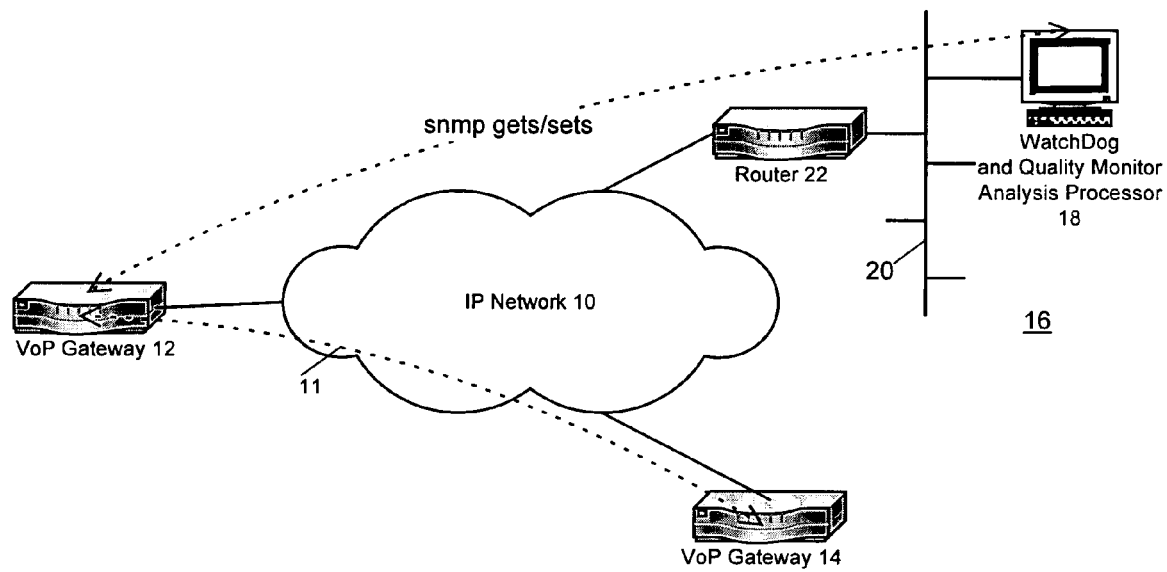

TECHNIQUE FOR MONITORING CONVERSATIONAL VOICE OVER PACKET

TECHNICAL FIELD

This invention relates to a technique for monitoring the quality of voice transmitted across a packet network.

BACKGROUND ART

Many communications service providers, such as AT&T, have begun to migrate voice traffic from conventional circuit-switch networks onto packet networks. To transport a voice call over a packet network, an ingress gateway digitizes outbound voice into packets for transport across a packet network, typically an Internet Protocol network, to an egress gateway. The egress gateway converts the packets into voice for ultimate receipt by a telephone set at a called party's premises. Voice originating at the called party's premise is converted by the egress gateway into packets for transport to the ingress gateway for conversion into voice received by the calling party.

Transmission of voice in this manner often referred to as "Voice over Packet" or "VoP" achieves more efficient use of resources. Unlike conventional circuit switched networks that require a dedicated communications path for the duration of a voice call, a single link in a packet network can carry packets associated with different calls. Stated another way, the communications link in a packet network is only dedicated for the interval needed to route packet for a given call for the time needed to route the packet from one hop to another.

Voice over Packet does suffer from a major disadvantage as compared to circuit-switched telephony. With circuit-switched telephony, various techniques exist for monitoring the quality of the call. For example, parameters, such as signal distortion, frequency response, and signal amplitude associated with a telephone call transported over a circuit switched network possess the capability of being monitored for to ascertain voice quality. Monitoring the quality of Voice over Packet calls has proven more problematic. While it is possible to measures to factors such as jitter and delay that affect Voice over Packet transmission, the exact correlation of these parameters to voice quality has heretofore proven difficult to predict with great accuracy.

Recently, the International telecommunications Union promulgated ITU-T Recommendation G.107 that proposed a model (referred to as the "E-Model") for summing impairment parameters to yield a metric indicative of the voice quality associated with calls over a specified path. Specifically, the E-Model embodied within the ITU-T Rec. 107 defined a measure of voice quality based on a Rating factor, called R, related to the Mean Opinion Score (MOS) of a call. The E-model defined R by the relationship:

$$R = 100 - I_s - I_d - I_{ef} + E \quad \text{(Equation 1)}$$

where $I_s$ represents the impairment of the voice quality within a path due to signal impairment, $I_d$ represents impairment to the voice quality due to delay, $I_{ef}$ represents the impairments due to various network equipment (e.g., codec compression and loss concealment) that impact the signal in a non-linear fashion, and E is a factor to cover lower user expectations of quality due to such things as convenience of service (e.g., wireless) and lower prices. The higher the R factor, the higher the quality of the conversational voice. The E-model gives analytic expressions for the $I_s$ and $I_d$ components in terms of channel characteristics such as noise and delay but the E-model leaves the $I_{ef}$ factor as a measurable quantity. Thus, the $I_{ef}$ factor depends on the specific network equipment employed to carry the call. Consequently, implementation of the E-Model requires apriori knowledge of the parameters of each piece of network equipment, which can prove especially difficult if packets must travel over different networks.

Thus, there is a need for a technique that enables a fully analytical measurement of the R factor in terms of measurable transport metrics to facilitate ongoing measurements of voice quality without apriori knowledge of the equipment within the network.

BRIEF SUMMARY OF THE INVENTION

Briefly, in accordance with a preferred embodiment of the invention, a method is provided for monitoring a packet transmission path in a network to establish a measure of the quality of conversational voice of Voice-over-packet transmissions on the transmission path. To monitor voice quality, at least one probe packet is injected for transport across the transmission path. The delay and packet loss of the probe packet is measured, and from such measurements, analytic values for voice impairment associated with delay and with loss in the network, respectively are established. A measure of the overall conversational voice quality of the path is then derived in accordance with the algebraic sum of the analytic values for voice impairment associated with delay and with loss in the network.

BRIEF DESCRIPTION OF THE DRAWING

FIG. 1 shows a block schematic diagram of a system in accordance with a preferred embodiment with the invention for monitoring a transmission path in a packet network to determine the conversational voice quality of Voice-over-Packet transmissions on the path.

DETAILED DESCRIPTION

FIG. 1 depicts a block schematic diagram of an Internet Protocol (IP) Network 10, such as the IP network maintained by AT&T. The network 10 includes at least one path 11 for transporting packets between a first Voice-over Packet (VoP) gateway 12, and a second Voice-over Packet gateway 14. The packets carried over the path 11 represent analog voice, such as the analog voice associated with a telephone call. Each of the VoP gateways 12 and 14 digitize the voice of one of the parties to a telephone call to create packets for transmission to the other gateway for conversion back to analog speech. In practice, the network 10 includes a plurality of paths 11, however, for purposes of simplicity, FIG. 1 depicts only a single path.

Unlike traditional circuit switched voice telephony which readily lends itself to various techniques for monitoring voice quality, Voice-over-Packet transmission does not readily lend itself to monitoring techniques that can easily ascertain the quality of conversational voice embodied within such transmissions. The International telecommunications Union promulgated ITU-T Recommendation G.107 (the "E-Model") for yielding a model to estimate the quality of voice conversations in accordance with Equation (1) discussed previously. However, the standard does not incorporate the impact of packet transport on the impairments and in fact buries this dependence in the $I_{ef}$ factor. The disadvantage associated with the E-Model proposed in the ITU-T Recommendation G.107 is that the voice quality impairment $I_{ef}$ due to network equipment is specific to the equipment within the network 10, thus requiring a full characterization of the performance of the network equipment. In the absence of fully analytical expression for $I_{ef}$, the ITU-T recommendation has not been implemented in practice.

In accordance with the invention, there is provided a system 16 for monitoring the conversational voice quality of VoP transmissions over the path 11 in accordance with the E-Model embodied within the ITU-T Recommendation G.107. The system 16 includes a Watchdog and Quality Analysis processor 18 linked though one of a Local Area Network (LAN) 20 to a router 22 connected to the network 10. Instead of LAN 20, a Wide Area Network (WAN), Intranet or the like could provide a link between the processor router 22 and the network 10. The processor 18 communicates with the ingress VoP gateway (e.g., gateway 12) associated with the path 11 of interest using a SET command in accordance with the Simple Network Management Protocol (SNMP) to inject one or more probe packets for transmission along the path. By using an SNMP GET command, the processor 18 can extract certain parameters associated with probe packet transit along the path 11, including delay, delay jitter and packet loss.

From the measured delay, delay jitter and packet loss, the processor 18 derives a measure of the conversational voice quality of VoP transmissions along the path 11 using E-model of the ITU-T Recommendation G.107 as follows. The term $I_s$ in Equation (1), representing the voice impairment due to signal loss, can be approximated by a default value of 5.8 in the ITU-T Recommendation G.107 itself, so that the term $100-I_s$ yields the value of 94.2.

The term $I_d$, representing voice impairment due to delay, has a very complex analytic derivation in the ITU-T Recommendation G.107. We have simplified derivation of the term $I_d$ by plotting this function as a function of the measured delay d and fit to a sum of two linear segments, yielding the expression $$I_d = b_1 d + b_2 (d-b_3) H(d-b_3) \quad \text{Equation (2)}$$

where $b_1 = 0.024$/ms, $b_2 = 0.11$/ms and $b_3 = 177.3$ ms and $H(x)$ is the Heavyside function.

As discussed previously, the term $I_{ef}$, representing voice impairment due to network equipment impairment, is not defined analytically in the ITU-T Recommendation G.107. However, we have been able to establish an analytical value for the term $I_{ef}$ by fitting a large quantity of voice measurements made under different conditions for various equipment using the expression, e.g.:

$$I_{ef} = g_1 + g_2 \ln(1+g_3 e) \quad \text{Equation (3)}$$

where:

$g_1$, $g_2$ and $g_3$ are parameters of curve fitting and e is the packet loss at the decoder. Example values for the parameters are $g_1=9.4$, $g_2=17$, and $g_3=60$ for a G.728 codec and $g_1=12$, $g_2=15$, and $g_3=60$ for a G.729a codec. Work continues to improve these analytical expressions for $I_{ef}$ and to extend the expressions to additional codec types.

Having established analytic values for $I_s$, $I_d$, and $I_{ef}$, the processor 18 can calculate a rating factor (R) that follows the E-Model embodied within the ITU-T Recommendation G.107 using the following relationship:

$$R \sim 94.2 - b_1 d - b_2(d-b_3) H(d-b_3) - g_1 + g_2 \ln(1+g_3 e)$$

Since the processor 18 can readily measure the transport metrics d and e by injecting probe packets for transport along the transmission path 11 of interest, the processor can thus derive a measure of the conversational voice quality of VoP transmission on the path in accordance with the ITU-T Recommendation G.107 on an ongoing basis. In other words, the processor 18 will typically inject probe packets at various times (typically on a periodic basis) to obtain measurements of the voice quality at different intervals.

The foregoing describes a technique for monitoring a packet transmission path in a network to establish a measure of the quality of conversational voice of Voice-over-packet transmissions on the transmission path in accordance with the ITU-T Recommendation G.107.

What is claimed is:

1. A method for monitoring a packet transmission path in a network to determine conversational voice quality of Voice-over-Packet transmissions across said path, comprising the steps of:

injecting multiple probe packets for transport across the transmission path;

measuring packet delay and packet loss for said probe packets across said path;

establishing an analytic value for voice quality impairment due to delay in accordance with measured packet delay;

establishing an analytic value for voice quality impairment due to said network in accordance with packet loss;

deriving a measure of overall conversational voice quality associated with the transmission path in accordance with the algebraic sum of the analytic values for voice quality impairment due to delay and voice quality impairment due to loss in said network; and wherein the analytic value for voice quality impairment due to delay ($I_d$) is obtained in accordance with the relationship:

$$I_d = b_1 d + b_2(d-b_3) H(d-b_3)$$

where $b_1 = 0.024$/ms, $b_2 = 0.11$/ms and $b_3 = 177.3$ ms, d is the measured delay and $H(x)$ is the Heavyside function.

2. The method according to claim 1 wherein the analytic value for voice quality impairment due to said network (If) is obtained in accordance with the relationship:

$$I_{ef} \approx g_1 + g_2 \ln(1+g_3 e)$$

where:

$g_1$, $g_2$ and $g_3$ are parameters of curve fitting and e is the measured packet loss.

3. The method according to claim 2 wherein the overall measure of conversational voice quality (R) associated with the transmission path is given by the relationship:

$$R \sim 94.2 - b_1 d - b_2(d-b_3) H(d-b_3) - g_1 + g_2 \ln(1+g_3 e).$$

4. A method for monitoring a packet transmission path in a network to determine conversational voice quality of Voice-over-Packet transmissions across said path, comprising the steps of:

injecting multiple probe packets for transport across the transmission path;

measuring packet delay and packet loss for said probe packets across said path;

establishing an analytic value for voice quality impairment due to delay in accordance with measured packet delay;

establishing an analytic value for voice quality impairment due to said network in accordance with packet loss;

deriving a measure of overall conversational voice quality associated with the transmission path in accordance with the algebraic sum of the analytic values for voice quality impairment due to delay and voice quality impairment due to loss in said network; and wherein the analytic value for voice quality impairment due to said network ($I_{ef}$) is obtained in accordance with the relationship:

$$I_{ef} \approx g_1 + g_2 ln(1+g_3 e)$$

where:

$g_1$, $g_2$ and $g_3$ are parameters of curve fitting and e is the measured packet loss.

5. A system for measuring monitoring a packet transmission path between in a network to determine conversational voice quality of Voice-over-Packet transmission across said path, said system including a processor connected to the network, the processor monitoring the voice quality by performing the steps of:

injecting multiple probe packet for transport across the transmission path;

measuring packet delay and packet loss for said probe packets across said path;

establishing an analytic value for voice quality impairment due to delay in accordance with measured packet delay;

establishing an analytic value for voice quality impairment due to said network in accordance with packet loss; and deriving a measure of overall conversational voice quality associated with the transmission path in accordance with the algebraic sum of the analytic values for voice quality impairment due to delay and voice quality impairment due to loss in said network; and wherein the processor establishes the analytic value for voice quality impairment due to delay ($I_d$) in accordance with the relationship:

$$I_d = b_1 d + b_2(d-b_3)H(d-b_3)$$

where $b_1=0.024$/ms, $b_2=0.11$/ms and $b_3=177.3$ ms, d is the measured delay and $H(x)$ is the Heavyside function.

6. The method according to claim 5 wherein the processor establishes the analytic value for voice quality impairment due to said network ($I_{ef}$) is obtained in accordance with the relationship:

$$I_{ef} \approx g_1 + g_2 ln(1+g_3 e)$$

where:

$g_1$, $g_2$ and $g_3$ are parameters of curve fitting and e is the measured packet loss.

7. The method according to claim 6 wherein the processor obtains an overall measure of conversational voice quality (R) associated with the transmission in accordance with the relationship:

$$R \sim 94.2 - b_1 d - b_2(d-b_3)H(d-b_3) - g_1 + g_2 ln(1+g_3 e).$$

* * * * *

UNITED STATES PATENT AND TRADEMARK OFFICE
CERTIFICATE OF CORRECTION

PATENT NO.         : 6,961,315 B1
APPLICATION NO.    : 09/717414
DATED              : November 1, 2005
INVENTOR(S)        : James M. Amster et al.

Page 1 of 1

It is certified that error appears in the above-identified patent and that said Letters Patent is hereby corrected as shown below:

In the Claims

Column 6, line 14, in Claim 6, delete "method" and insert --system-- therefor.

Column 6, line 24, in Claim 7, delete "method" and insert --system-- therefor.

Signed and Sealed this
Twenty-seventh Day of May, 2014

Michelle K. Lee
*Deputy Director of the United States Patent and Trademark Office*